March 24, 1964   R. D. DRUSHELLA   3,126,302
FUEL CELL AND MODULE
Filed April 6, 1960
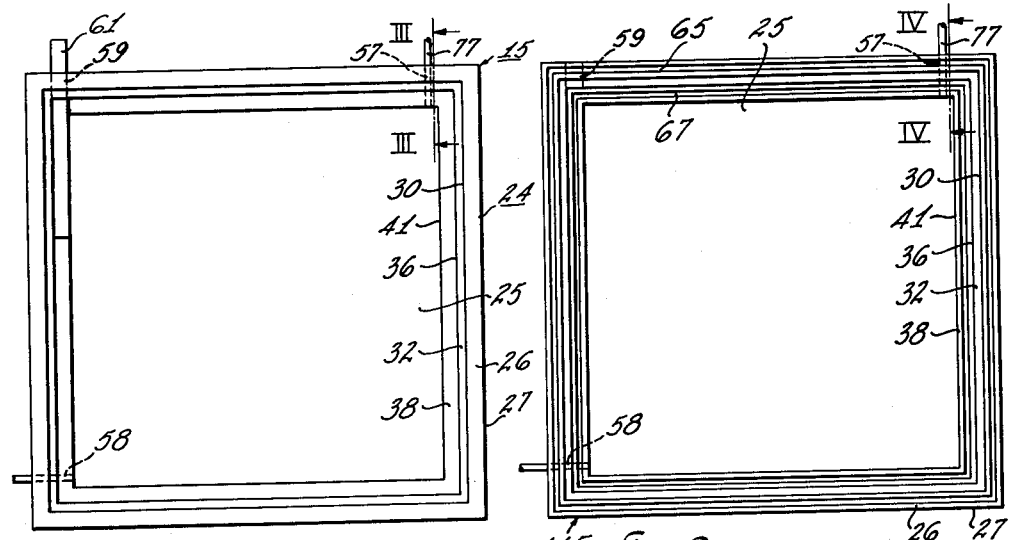
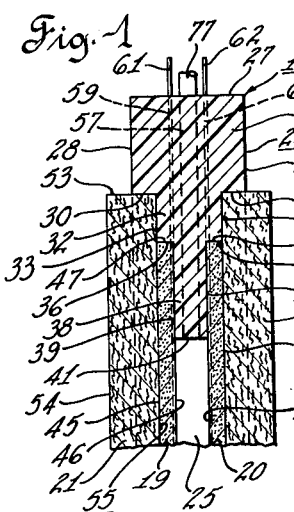
Inventor
Richard D. Drushella
by Richard R. Mybeck
Attorney ns patented mar 24 1964

United States Patent Office 3,126,302
Patented Mar. 24, 1964

3,126,302
FUEL CELL AND MODULE
Richard D. Drushella, Milwaukee, Wis., assignor to Allis-Chalmers Manufacturing Company, Milwaukee, Wis.
Filed Apr. 6, 1960, Ser. No. 20,393
5 Claims. (Cl. 136—86)

This invention relates generally to the manufacture of fuel cells and more particularly to means and methods for building such cells and assembling such cells into modules.

A certain amount of confusion has occurred as to the meaning of certain terms applied in this art. For clarity, therefore, let it be known that:

"Fuel cell," as the term is used herein, defines a basic operating unit consisting of two electrodes, electrolyte media electrically interposed between the electrodes, an external electrical circuit connecting the electrodes, and means to supply a different reactive gas to each of the electrodes;

"Module," as the term is used herein, defines an assemblage of several fuel cells in an electrically conductive sequence to provide a concerted electrical result; and "Reactive gases," as used herein, define those gaseous compounds which react with each other to form a product possessing less energy than that possessed by the individual reactants, so that in reacting, energy is released therefrom which is directly convertible to electricity, e.g., $H_2 + \frac{1}{2} O_2 \rightarrow H_2O + \text{energy}$.

Further discussion of fuel cell chemistry as well as additional background of a general nature may be found in an article entitled "Fuel Cells" written by Leonard G. Austin for the October 1959 issue of Scientific American, published by Scientific American, Inc., New York 17, New York, pp. 72–78, and in U.S. Patent No. 2,384,463, R. Gunn et al., September 11, 1945.

Many fuel cell systems are presently under investigation in the nation's research facilities as are many individual aspects of each of the several systems. Thus, the search goes on for better and less expensive fuels; better and less expensive electrolyte media; better and less expensive electrodes; better, less expensive and universally adaptable operating parameters; better and less expensive supporting structure; means for increasing the power output and reducing the size and weight of the cells; and so on. For a relatively comprehensive review of the present status of fuel cell development, attention is directed to "Status Report on Fuel Cells," by B. R. Stein, ARO Report No. 1, U.S. Department of Commerce, Office of Technical Services, June 1959 (PB 151804).

A more particular aspect of the present invention reflects the design of improved means and methods of mounting the internal electrical components of a fuel cell to provide fuel cell modules having hollow electrodes, a vastly improved power/weight ratio, a compactness heretofore unknown, and the ability to operate commercial size vehicles, e.g., farm tractors, while being totally contained in and supported by the vehicle.

Hollow electrodes broadly are known heretofore as suspended plaques (described in the aforementioned patent to Gunn et al.), thin foils adhered to opposite surfaces of a porous electrolyte vehicle (described in U.S. 409,366, Mond and Langer, August 20, 1889) and porous carbon cylinders.

All of these electrodes possess disadvantages. For example, the Gunn type of electrodes are too bulky to become commercially practicable, the Mond type of electrodes are far too delicate and fragile to withstand rugged use and too cumbersome to assemble, and the cylindrical electrodes consume so much space that they offer little hope to achieve satisfactory power outputs from practicable sized cells.

The present invention, among other things, is based on the discovery of means and methods for making fuel cells and modules which overcome the aforementioned disadvantages of prior electrodes by utilizing a novel holder arrangement to effect a sandwich design, to be hereafter described in detail.

Accordingly, one of the prime objects of the present invention is to provide means and methods for mass producing fuel cells and assembling fuel cells into a compact module.

Another object of the present invention is to provide an improved holder design which may be readily employed in a sequential installation irrespective of electrode polarity or module size.

It is a further object of the present invention to provide improved holders for fuel cell components which further coact to define a gastight casing about the module resulting from the assembly thereof.

It is still another object of the present invention to provide an improved holder into which a pair of electrodes of like polarity are sealed in substantially fixed spaced relationship to each other and coact therewith to define an enclosed chamber therein for fueling the electrodes when assembled into a fuel cell module.

A still further object of the present invention is to provide an improved holder in which a pair of electrolyte vehicles are seated in operative engagement with a pair of electrodes also seated therein in substantially fixed spaced relationship to each other.

An even further object of the present invention is to provide an improved fuel cell module having a generally smooth outer contour and which requires no external bolts or other like clamping means to maintain it in assembled condition but rather is internally locked in operative position.

Still another object of the present invention is to provide a fuel cell module having an improved structure which can be readily mass produced and assembled by unskilled workers in an expeditious and inexpensive manner.

These and still further objects, as shall hereinafter appear, are readily fulfilled by the present invention in a most unexpected manner as shall become apparent from the following detailed description, particularly when it is read in connection with the accompanying drawing in which like parts bear like identification throughout the several views.

In the drawing:

FIG. 1 is a plan view of a holder for fuel cell components made in accordance with the present invention;

FIG. 2 is a plan view of another holder of fuel cell components made in accordance with the present invention;

FIG. 3 is a cross sectional view taken along line III—III of FIG. 1;

FIG. 3A is a fragmentary showing of the view of FIG. 3 showing another modification in accordance with this invention;

FIG. 4 is a cross sectional view taken along line IV—IV of FIG. 2; and

FIG. 5 is an oblique cross sectional view of a fuel cell module, partially broken away for clarity, embodying the present invention.

Referring now to the details of construction of the embodiment of the invention shown in the attached drawing, FIG. 5 shows a fuel cell module 10 formed of five fuel cells, A through E, inclusive, sandwiched between end plates 11 and 12.

Module 10, the assembly of which shall be hereinafter described in detail, comprises a plurality of holders 13 through 18, inclusive, mounted in tight engagement with each other. Each holder, for example, holder 15, supports a pair of electrodes 19, 20 and the inner portion of each of a pair of electrolyte vehicles 21, 22. Holders 13 through 18 are sandwiched together, in the manner to be hereinafter described, to maintain the several holders in snug operative condition at all times.

One embodiment of a holder made in accordance with the present invention is exemplified in FIGS. 1 and 3. As illustrated, the holder, for example, holder 15, comprises a generally rectangular frame member 24 having a central similarly shaped opening or space 25 defined therethrough, the function of which will be later described in detail.

Each frame member comprises an outer or border portion 26 having an outer peripheral edge 27 which extends between first and second lateral faces 28, 29 (see FIG. 3). Faces 28, 29, as shown, extend between edge 27 and shoulder portions, or innermost surfaces of the border portions, 30, 31, respectively, disposed substantially parallel to edge 27.

Each frame member further comprises an intermediate or body portion 32 which commences in the plane of shoulder portions 30, 31 and extends inwardly between first and second lateral faces or side surfaces 33, 34 to a second set of shoulder portions, or innermost surfaces of the body portions, 36, 37. The second set of shoulder portions 36, 37 are disposed (see FIG. 3) in generally parallel inset relationship to the shoulder portions 30, 31.

Finally, each frame member further comprises an inner or flange portion 38 which commences in the plane of shoulder portions 36, 37 and extends inwardly between its first and second lateral faces or side surfaces 39, 40 to an inner edge 41 which bounds and confines space 25.

In the preferred construction of this embodiment, the corresponding lateral faces of each of the several member portions are generally smooth and substantially parallel to each other. In a similar manner, edges 27, 41 and shoulder 30, 31, 36 and 37 preferably all lie in substantially parallel planes to each other. This relationship remains constant although the planes themselves may, of course, change around the perimeter of the frame.

It will be noted in FIG. 3 that the three portions of the frame are of diminishing thickness from the thickest or border portion 26 to the thinner of flange portion 38. Each of the several portions are illustrated generally symmetrical about a common bisecting axis extending therethrough although, as shall appear, this may be varied under certain circumstances.

Holder 15 may be formed of any suitable electrically nonconductive material such, for example, as epoxy resin and the like, using any suitable technique such, for example, as casting, stamping, pressing, cutting and the like.

As shown in FIG. 3, surfaces 39, 40 of holder portion 38 join at portion 32 to respectively define shoulders 36, 37 while surfaces 33, 34 of body portion 32 intersect with portion 26 to respectively define shoulders 30, 31. Each of the flange surfaces, for example, surface 39, respectively coact with the adjacent one of the shoulder portions, for example, shoulder 36, to define a seat of the first pair of seats of the frame member into which, as shall herein be described, one of the electrical components of the module is mounted.

In one practice of the present invention, flange portion 38 will be so disposed relative to body portion 32 that shoulders 36, 37 are of identical dimensions. This is preferred because it is found expeditious and advantageous to use identically shaped electrodes.

It is, of course, understood, however, that the present invention is equally applicable when electrodes of diverse thicknesses are employed provided shoulders 36, 37 are dimensioned to substantially conform in width to the thickness of the electrode plaque with which it will be associated to permit the surface of the electrode plaque to establish a flush relationship with the adjacent surfaces of body portion 32.

The mounting of the electrodes 19, 20 into holder 15 (see FIG. 3), will now be described.

Each electrode, for example, electrode 19, comprises a thin (about 1/64 to about 1/4 inch thick) plaque having first and second lateral faces or side surfaces 45, 46, respectively. Faces 45, 46, while shown generally rectangular, may, of course, be of any desired shape provided they substantially conform in geometry and area to the space bounded by complementing shoulder portion 36.

Each electrode, for example, electrode 19, also has an outer or peripheral edge 47 (considering the several sides of the plaque to define a single continuous edge) which substantially complements the dimensions of its corresponding shoulder, for example, shoulder 36. Thus, when electrode 19 is placed into overlaying engagement with surface 39 of flange portion 38, edge 47 will engage shoulder 36 in a slideable but tight relationship therewith.

Similarly, another electrode 20, having faces 49, 50, may be seated upon and in overlaying relationship with surface 40 of flange portion 38 while the outer edge 51 of the electrode 20 defines a slideable but tight relationship with shoulder 37.

In assembling electrodes 19, 20 into holder 15, a suitable cement, such, for example, as adhesive epoxy resin and the like, is coated slightly upon surfaces 39, 40 and shoulders 36, 37 of holder 15 or upon that portion of the inner surface of the electrode (for example, surface 46 of electrode 19) which engages the surfaces of flange portion 38 and upon the outer electrode edge (for example, edge 47 of electrode 19), or upon both the electrode and the holder, whereupon a firm gastight bond is effected between the electrodes and the holder.

When thus mounted, as can be seen in FIG. 3, the electrodes are seated in the holder 15 in such a manner that space 25 becomes an enclosed chamber.

When the electrodes 19, 20 are thus mounted in the electrode seats respectively defined by the cooperation between shoulder 36 and face 39, for one electrode, and shoulder 37 and face 40, for the other electrode, the next phase of the assembly comes into view.

First, however, it should be noted that quite satisfactory gastight bonds between the electrodes 19, 20 and their supporting surfaces 39, 40 can also be obtained using either induction or dielectric heating whereupon the electrodes are literally fused into flange portion 38.

The next phase of assembly involves the electrolyte vehicles as shall now be described.

Each electrolyte vehicle, for example, vehicle 21, comprises a generally rectangular sheet of a fibrous like porous material. An example of a material especially suited for use as an electrolyte vehicle is asbestos although other ceramic and mineral products such, for example, as alumina, magnesia, silica, various amounts of the alkaline metal and alkaline earth compounds may also be used to form the desired porous body.

To convert the porous sheet into a usable electrolyte vehicle, the sheet is wetted but not saturated with any suitable aqueous electrolyte such, for example, as the alkali hydroxides including aqueous solutions of potassium hydroxide, sodium hydroxide and the like. As a matter of expense and convenience of handling, potassium hydroxide is perhaps preferred.

Referring again to FIG. 3, surface 33 of body portion 32 cooperates with shoulder portion 30 of border portion 26 to define an electrolyte vehicle seat therewith, which is one of the second pair of seats of the frame member. Similarly, surface 34 cooperates with shoulder portion 31 to define a second electrolyte vehicle seat therewith. As shown, vehicle 21 is mounted in the left hand (relative to the drawing) seat while vehicle 22 is mounted in the right hand seat.

It is found that no additional means are needed to hold the electrolyte vehicles in their respective seats especially when they are emplaced either in a dry or freshly wetted condition because the material, e.g., asbestos, expands slightly upon wetting whereupon the outer peripheral edge 53 thereof (looking at vehicle 21) will bear into shoulder 30 to render the assembly self-sustaining.

It will be noted that thus mounted, each vehicle (for example, vehicle 21) has a first open lateral or side surface 54 which faces outwardly from the adjacent electrode 19 and a second lateral or side surface 55 which engages in substantially complete surface engagement the adjacent surface 45 of electrode 19 in overlapping relationship thereto.

In preferred form, each vehicle, for example, vehicle 21, will have a thickness equal to approximately twice the depth of its corresponding seat so that when mounted, only about one-half of the vehicle is incased by the holder 15.

In this fashion, the electrolyte vehicles (corresponding to vehicles 21, 22 as illustrated in FIG. 3) of the holders immediately adjacent the holders assembled in the fashion described will not require electrolyte vehicles but rather will share the vehicle from its adjacent holder. The protruding half of the vehicle will be seated in the adjacent holder in exactly the same manner as is the incased half portion.

To avoid confusion, it should be mentioned that when electrode 19, 20 and electrolyte vehicles 21, 22 are mounted into their respective holders in accordance with the foregoing description (see FIG. 3), they do not define a complete fuel cell but rather two half cells of common polarity, i.e., the two electrodes will both function either as anodes or cathodes depending on whether the fuel gas or the oxidizing gas is fed into the gas space 25 defined therein.

When holders 13 through 18 are assembled into a module 10, as shown in FIG. 5, the "polarity" of the holders is alternated. Thus, if holders 13, 15, 17 contain anodes, the intermediate holders 14, 16 and 18 will contain cathodes. This polarity of electrodes is achieved, as is known, by feeding one of the reactant gases, e.g., the fuel gas type such as hydrogen, into the gas spaces in holders 13, 15, 17, and the other, e.g., the oxidizing gas such as oxygen, into the gas spaces in holders 14, 16 and 18. In this fashion, the five complete fuel cells A, B, C, D and E are created in module 10.

Each of the reactant gases, as mentioned above, is provided with its own feeding system which must be completely independent of that of the other gas. The system directs the gas from a suitable source (not shown) through the desired gas space in the manner to be now described.

Thus, as shown in FIG. 3, each gas space 25 in each electrode holder is provided with a pair of passageways 57, 58, respectively, providing the ingress and egress of a reactant gas through space 25. Preferably passageway 57, the gas-in passage, will be in or adjacent one side of the holder, e.g., the top, and passageway 58, the gas-out passage, will be in or adjacent an opposite side of the holder, e.g., the bottom, to aid in the dispersion of the gas over the acting surfaces of the electrodes adjacent thereto and the removal of any reaction product, such, for example, as water therefrom.

As illustrated, passageways 57, 58 extend straight out through the frame (in this way they can be easily precast) although, if desired, they may connect with an axially extending feed passage of the type described by Mr. Allen J. Hipp in co-pending application, Serial No. 18,078.

It has been found especially advantageous to cast all of the holders alike in a predesigned mold so that the aforementioned passageways 57, 58 and additional passageways 59, 60 (whose function will hereinafter be explained) are fixed in their relative position. Alternatively, though a more costly operation, holders may be cast solid and the several passageways drilled or otherwise machined into the cell frame.

Passageways 59, 60 can be defined through body portion 32 and border portion 26 (as shown in FIG. 3), one being intermediate the plane of surface 39 of flange portion 38 and the plane of face 33 of body portion 32 (communicating between edge 27 with shoulder 36) and the other being intermediate the planes of surfaces 34 and 40 (communicating between edge 27 and shoulder 37). Passageways 59, 60 are defined complementary to electrical leads 61, 62, respectively, extending from electrodes 19, 20 for connection to an external circuit (not shown). As shown in FIG. 3A, the passageways 64 (one not shown) can also be defined through border portion 26 in alignment with lateral surface 34 of body portion 32 so that electrode lead 62 will pass therethrough and will lie upon surface 34. The slight thickness of the lead will not impair the seating of electrolyte vehicle 22, but rather, vehicle 22 will readily accept the lead in shape conforming relationship therewith by virtue of its porous nature.

Both the arrangements of FIGS. 3 and 3A are satisfactory, however, for mass production purposes, the arrangement shown in FIG. 3A is more easily executed.

As previously mentioned, the electrodes incased in a given holder have a common polarity and, therefore, leads 61, 62 represent either two positive or two negative leads, one being from each of two contiguous fuel cells. The next pair of leads adjacent leads 61, 62 are, of course, of opposite electrical orientation and, therefore, will not connect to the same conductor as will leads 61, 62. When assembled into module form, therefore, the leads from a given holder will alternatingly be connecting to one or the other of a pair of independent conductors in a system substantially identical to that described for isolating and feeding the reactive gases.

Thus, as is now apparent, gas from only one source is permitted to flow through the gas space of any one holder at a given time while the leads carrying the electricity produced by the cell will be connected to only one conductor at a given time.

Another holder 115 exemplary of the present invention is shown in FIGS. 2 and 4 and comprises a frame member 24 having an outer or border portion 26, and intermediate or body portion 32 and an inner or flange portion 38. As in the manner described for exemplary holder 15, border portion 26 presents an outer edge 27, lateral faces 28, 29 and inwardly facing shoulders 30, 31. Similarly, body portion 32 presents faces 33, 34 intersecting respectively with shoulders 30, 31 and inwardly facing shoulders 36, 37 disposed in substantially parallel planes to the shoulders of portion 26 but inset therefrom. Flange portion 38 also is provided with lateral faces 39, 40 and an inner edge 41 lying contiguous with and circumscribing open area or space 25 defined in frame member 24.

A suitable gas inlet 57 is disposed intermediate of and in communicative relationship with inner edge 41 of portion 38 and outer edge 27 of border portion 26, passing through body portion 32 whereby a suitable reactive gas may be fed from a suitable gas source (not shown) into space 25. Gas outlet 58 is similarly defined through another segment of the frame member 24, preferably removed from inlet 57 so that the gases will be required to substantially completely disperse over the electrode faces before gaining egress through outlet 58.

Each holder 115 is further provided with suitable passages 59, 60, one each disposed in cooperative relationship with one of the electrode plaques 19, 20, mountable in the holder to provide passage for electrical leads 61, 62 which extend from electrodes 19, 20, respectively.

Referring now specifically to FIG. 4, exemplary holder 115 is further provided with a plurality of reentrant recesses or grooves 65, 66, 67, 68 disposed one each in each of the oppositely facing surfaces 28, 29 of border portion 26 and one each in each of the oppositely facing surfaces 39, 40 of flange portion 38.

The first set of grooves 65, 66, disposed respectively in surfaces 28, 29, are preferably in substantial alignment with each other so that when several holders are abutted together, the grooves will register with like grooves defined in the abutting surfaces of the adjacent holders. The function of these registered grooves will be described in connection with the assembly of module 10.

The second set of grooves 67, 68, disposed respectively in surfaces 39, 40, do not require precise alignment although a stronger casting (if this technique is used to fabricate the holder) may result if these grooves are set back at least about midway between edge 41 and the respective shoulder portions 36, 37.

As can be seen in FIG. 2, groove 65, in border portion 26, and groove 67, in flange portion 38, extend completely around with frame member 24 so that each may be considered as circumscribing opening 25. Of course, the same is true for grooves 66, 68 even though they are hidden from view in FIG. 2.

Referring now to FIG. 5, one practice of assembling the holder units into a fuel cell module containing any desired number of fuel cells, for instance, five, will now be described.

Several electrode holders are prepared by cementing or otherwise bonding a pair of electrodes in the electrode or electrode seats as described. If holders of the type shown in FIGS. 1 and 3 are employed, a thin coating of cement is applied either to the electrode seat (e.g., shoulder 36 and face 39) or to the mating surface of the electrode or both. As previously indicated, adhesive epoxy resin formulations are found exceptionally suited for use when the frame members are cast from epoxy resins although there are many other suitable and compatible frame-adhesive systems which may be employed. (By "compatible" is meant that the adhesive formulation will not include constituents which attack the frame material.) Or if desired, induction or dielectric heating may be employed in lieu of the cement.

When it is desired to mount electrodes 19, 20 into a holder of the type shown in FIGS. 2 and 4, it is preferred to spread or otherwise deposit the adhesive formulation in grooves 67 and 68 where, upon placement of electrodes 19, 20 into their respective seats, an effective and tight bond is created.

Normally, electrodes 19, 20 will have their respective leads 61, 62 formed integrally with the surface adjacent gas space 25 (as shown in FIG. 3) or with the surface adjacent the electrolyte vehicle (as shown in FIG. 3A) which leads will be passed into their respective passageways.

Alternatively, leads 61, 62 may be embedded in frame member 24 during the fabrication thereof (see FIG. 1) and a thin coating of cold soldering compound employed to perfect the electrical contact between the lead and its corresponding electrode.

With the holders thus prepared from the several frame members, the module 10 may be formed by placing flat end plate 11, having a surface area and geometry substantially corresponding to the area and geometry of the area bounded by shoulder 30, into holder 13 and fastening the plate, in any suitable fashion, such as with cement, into the seat defined by shoulder 30 cooperating with lateral face 33 whereupon a gastight bond is perfected.

If preferred, electrode 19 may be replaced in holder 13 by a dummy electrode 72, made of lucite or other relatively inexpensive material, since, as will appear, the end electrodes in a module do no work.

Dummy electrode 72 may be secured to holder 13 in a fashion similar to that described for electrodes 19, 20, i.e., by cementing, fusion and the like.

Holder 13, thus assembled, may then be laid upon any suitable support with the end plate 11 down.

An electrolyte vehicle is next placed into the seat defined by shoulder 31 and face 34 with, preferably, about one-half its thickness extending upwardly beyond the plane of surface 29.

Holder 14 next is oriented and placed on the resulting "stack" with the upwardly extending portion of the electrolyte vehicle seated by shoulder 30 and surface 33 of holder 14. As surface 28 of holder 14 engages surface 29 of holder 13, the thin layer of cement previously coated upon these surfaces sets and forms a cohesive bond between these holders.

In a similar manner, holders 15, 16, 17 and 18 are fastened into the stack with electrolyte vehicles juxtaposed therewith until the desired number of cells have been created.

The final holder, holder 18, is placed upon the stack to complete module 10 and may likewise have its end electrode plaque removed and replaced by a second dummy electrode 73. Then, after dummy electrode 73 is mounted in the manner described for dummy electrode 72, second end plate 12, corresponding to the seat, defined by shoulder 31 cooperating with surface 34 of holder 18, is secured into its frame and the module is complete.

Another method of constructing a module is by use of a structure composed of a frame member, for example number 18, which is a preferred type holder and in which are mounted the electrodes and an electrolyte vehicle that has a thickness of approximately twice the depth of the seat it engages. On the top of this structure is placed a similar structure that contains the electrodes and the electrolyte vehicle mounted in frame member 17 which frame member also encloses the half of the electrolyte vehicle not seated in 18. Structures embodying frame members 16, 15 and 14 are similarly assembled. To complete the fuel cell forming relationship on this end of the assembly, frame member 13 with two plaques mounted therein would be placed so as to enclose the projecting half of the electrolyte vehicle seated in frame member 14. The plaque mounted in 14 that is adjacent to the electrolyte vehicle would be an electrode while the other plaque could be a dummy electrode if desired since it would not do any work. End plate 11 would be affixed in the electrolyte vehicle seat that is adjacent to the possible dummy electrode in frame member 13 to complete this end of the module. On the other end of the assembly, the electrode plaque on the nonabutting side of frame member 18 could also be replaced with a dummy electrode if desired. End plate 12 would be affixed in the electrolyte vehicle seat that is adjacent to the possible dummy electrode and thus complete this end of the module.

While, as a variant, it may be desired to form an electrode simulating portion on the end plates as an integral structure, experience indicates that the separate dummy electrodes and end plates shaped to correspond to the electrolyte vehicles make for an easier and less expensive assembly operation.

With the holders assembled in the manner described, and it is presumed that all had common orientation, it is found that all of the gas inlets, all of the gas outlets, and all of the electrical leads share a common orientation with respect to the module as thus formed.

A further modification thus found to enhance the usability of the module, its connectability to the gas sources (which, as indicated, must be isolated from each other) and its connectability to the external electrical circuit (which must avoid short circuiting if it is to be effective) results from the following technique.

After holder 13 has been placed upon a suitable surface to commence the stack, holder 14 will be rotated about a side before being added to the stack whereby the gas and electrical lead passageways assume a different orientation. The next holder 15 will be oriented to correspond to holder 13 while holder 16 will be oriented with holder 14, alternating orientation until the module is complete. In this fastion, alternating holders, for example, holders 13, 15, 17, which receive the same gas and produce like electrical polarity will be oriented alike but will differ in orientation from the intermediate holders, for example, holders 14, 16, 18. Holders 14, 16, 18 will, however, conform in orientation to each other and, since these holders all receive the same gas (not the gas directed to holders 13, 15, 17) and their electrical leads have the same electrical polarity (not the polarity coming from the leads of holders 13, 15, 17), it can be seen, as shown in FIG. 5, that the feeding of the gases to and withdrawal of electrical energy from the several cells in the module is greatly simplified by this arrangement.

Thus, as shown in FIG. 5, a suitable feeder 75 directs one reactive gas into the gas spaces 25 of holders 13, 15, 17 through respective tap lines 76, 77, 78, while another suitable feeder 80 directs another reactive gas into gas spaces 25 of holders 14, 16, 18, through respective tap lines 81, 82, 83. Feeders 75, 80 are thus permitted to maintain a spaced and independent relationship to each other.

Further, the electrical leads from all anodes (indicated by "+") and the electrical leads from all cathodes (indicated by "—") are connected to independent and spaced conductors 84, 85, respectively, which then may be subsequently connected to other electrical equipment in any desired fashion.

When practicing the above described assembly utilizing electrodes of the type herein designated 115, the coating or otherwise painting of adhesive on surfaces 28, 29 can be eliminated in favor of depositing adhesive in grooves 65, 66 which, when the holders are positioned with the grooves aligned as previously indicated, sets up to form a tenacious and gastight bond between the several holders. Similarly, the grooves adjacent dummy electrodes 72, 73 will likewise be filled with the cement which then will tenaciously bond the dummy electrodes to the holder. The dummy electrodes thus fulfill two important functions, namely, to close space 25 to define the gas chamber in the end holders, e.g., holders 13, 18, and to fill up what otherwise would be a space into which uncontrolled expansion of the components might occur.

An aspect of module design described in the aforesaid application of Allen J. Hipp, Serial No. 18,078, may also be used herewith if desired. Thus, when the module contains large thin electrode plaques, that is, plaques having an inner surface area which is greater than about 9" x 9" and a thickness of about 1/8" or less, it has been observed that they sometimes have a tendency to bow away from the electrolyte vehicle thereby obstructing the flow of gas through the gas space associated therewith and significantly reducing the surface to surface contact desired between the abutting surfaces of the electrode and electrolyte vehicle. Occurrence of such bowing is readily evidenced by a sudden and appreciable drop in current density over the offending cell.

To counteract this bowing, Hipp teaches placing an elongated spacer means diagonally across the gas space preferably transversely to the alignment of the gas passageways whereupon bowing is prevented and the obstruction of the gas flow by the electrodes is obviated. The diagonal disposition of the spacer is believed to aid dispersion of the gas over the electrodes.

Having described the structure and assembly of the fuel cell and module of the present invention, it is, of course, understood that any of the materials and techniques for making the electrical components such, for example, as the electrodes and electrolyte vehicles, may be employed within the scope of this invention. Some such techniques are described in the aforementioned patent to Gunn et al. and need not be discussed here in detail.

Thus, electrodes 19, 20, which are exemplified as generally rectangular thin plaques, may be the reticulated foraminous type (which is electrically conductive in character and can be fabricated in any convenient manner from any suitable metal, alloy, highly conductive oxide or conductive oxide mixtures such, for example, as nickel, iron, copper, nickel chromium, steel, copper oxide, magnetite and the like), or of a sintered type (which is also electrically conductive and can be fabricated in any convenient manner by spreading, on a foraminous or reticulated electrically conductive base screen of nickel or other electrically conductive material, a layer of metalliferous particles of, for example, nickel or nickel oxide or any other suitable metal, metallic oxide or mixtures thereof, for subsequent sintering in a furnace under reducing conditions and at a temperature just below the melting point of the several materials).

If it is desired to use the electrodes in low temperature, low pressure cells, it is found that the catalytic activity of the electrodes can be measurably enhanced if a coating of a metal or metals of the class of noble metal catalysts is applied to the electrically conducting surfaces of the electrode. In the group of noble metal catalysts are included platinum, palladium, rhodium and iridium. The black forms of these metals expose more surface to the gas and, hence, are more active catalytically. Catalysts of course may be applied to the electrode surface by any suitable technique such as knife coating, electrolysis and the like. When electrolysis is used, it is preferred to clean or etch the plaque first to enhance the bonding of the catalyst to the plaque.

Suitable reactant gases which may be employed in the fuel cell of the present invention as a fuel include hydrogen, the electrochemically reactive hydrogen compounds such, for example, as aliphatic hydrocarbons and alcohols, e.g., methane, ethane, methanol, ethanol, etc., and the like; while suitable oxidants include oxygen, air and the like.

In operation, the fuel cell module herein described functions in the same general manner as those described in the aforementioned article by Austin. Thus, if hydrogen and oxygen are employed as reactant gases, the half reaction occurring at the anode and the half reaction occurring at the cathode coact to produce an electrode in the external circuit and a total reaction of $$H_2 + \tfrac{1}{2}O_2 \rightarrow H_2O + \text{energy}$$

earlier described.

The energy thus formed does the work.

It now can be seen that the invention herein described and illustrated fulfills all of the aforestated objectives in a remarkably unexpected fashion and, in so doing, provides a significant advance in the art of fuel cells and the formation of modules therefrom.

It is, of course, understood that the embodiments herein described and illustrated are presented to exemplify the present invention rather than to limit it. Indeed, it is intended that such modifications, alterations and applications of the present invention as readily rseult from a perusal of this disclosure by one skilled in the art are within its spirit and especially as defined by the scope of the claims appended hereto.

Having now particularly described and ascertained the nature of my said invention and the manner in which it is to be performed, I declare that what I claim is:

1. A frame member for use in assembling a fuel cell module having an opening therethrough defined by an inner peripheral flange portion, said frame member also including an outer peripheral border portion and an intermediate body portion uniting said flange and border portions, said flange portion presenting an innermost surface and a pair of oppositely facing generally similar side surfaces, said side surfaces each being joined at its outer end with an innermost surface of said body portion which innermost surface extends away from said flange so as to form a first pair of laterally projecting seats, said body portion also presenting a pair of side surfaces each being joined at its outer end with an innermost surface of said border portion which innermost surface extends away from said body portion so as to form a second pair of laterally projecting seats disposed in outwardly and laterally spaced relation with respect to the first pair of seats, and said frame member also having a pair of gas passages communicating with said opening through a pair of areas of said innermost flange surface which are disposed across from each other on generally opposite sides of said opening, said pair of gas passages each extending from said opening outwardly through said flange and body portions and toward the outer periphery of the border portion of said frame member.

2. A structure for use in assembling a fuel cell module comprising a frame member having an opening therethrough defined by an inner peripheral flange portion, said frame member also including an outer peripheral border portion and an intermediate body portion uniting said flange and border portions, said flange portion presenting an innermost surface and a pair of oppositely facing generally similar side surfaces, said side surfaces each being joined at its outer end with an innermost surface of said body portion which innermost surface extends away from said flange so as to form a first pair of laterally projecting seats, said body portion also presenting a pair of side surfaces each being joined at its outer end with an innermost surface of said border portion which innermost surface extends away from said body portion so as to form a second pair of laterally projecting seats disposed in outwardly and laterally spaced relation with respect to the first pair of seats, and said frame member also having a pair of gas passages communicating with said opening through a pair of areas of said innermost flange surface which are disposed across from each other on generally opposite sides of said opening and a pair of electrical lead receiving passageways extending inward from the outer periphery of said border portion and terminating in one of said pairs of laterally projecting seats, said pair of gas passages each extending from said opening outwardly through said flange and body portions and toward the outer periphery of the border portion of said frame member, a pair of electrode plaques each having a peripheral edge and an adjoining side usrface engageing the complementary surfaces presented by each of said first pair of seats and being positioned thereby in spaced relation with said flange disposed therebetween, a pair of electrical leads operatively connected with said pair of electrode plaques and extending outwardly therefrom through said pair of lead receiving passages to the exterior of said frame member, and a pair of electrolyte vehicles each having a peripheral edge and an adjoining side surface engaging the complementary surfaces presented by each seat of said second pair of seats and being positioned thereby with a side thereof abutting a side of the adjacent one of said pair of plaques.

3. A structure for use in assembling a fuel cell module comprising a frame member having an opening therethrough defined by an inner peripheral flange portion, said frame member also including an outer peripheral border portion and an intermediate body portion uniting said flange and border portions, said flange portion presenting an innermost surface and a pair of oppositely facing generally similar side surfaces, said side surfaces each being joined at its outer end with an innermost surface of said body portion which innermost surface extends away from said flange so as to form a first pair of laterally projecting seats, said body portion also presenting a pair of side surfaces each being joined at its outer end with an innermost surface of said border portion which innermost surface extends away from said body portion so as to form a second pair of laterally projecting seats disposed in outwardly and laterally spaced relation with respect to the first pair of seats, and said frame member also having a pair of gas passages communicating with said opening through a pair of areas of said innermost flange surface which are disposed across from each other on generally opposite sides of said opening and a pair of electrical lead receiving passageways extending inward from the outer periphery of said border portion and terminating in one of said pairs of laterally projecting seats, said pair of gas passages each extending from said opening outwardly through said flange and body portions and toward the outer periphery of the border portion of said frame member, a pair of electrode plaques each having a peripheral edge and an adjoining side surface engaging the complementary surfaces presented by each of said first pair of seats and being positioned thereby in spaced relation with said flange portion disposed therebetween, a pair of electrical leads operatively connected with said pair of electrode plaques and extending outwardly therefrom through said pair of lead receiving passageways to the exterior of said frame member, and a pair of electrolyte vehicles each having a peripheral edge and an adjoining side surface engaging the complementary surfaces presented by each seat of said second pair of seats and being positioned thereby with a side thereof abutting a side of the adjacent one of said pair of plaques, said vehicles each having a thickness approximately equal to twice the lateral extent of each of said innermost surfaces on said border portion.

4. A structure for use in assembling a fuel cell module comprising a frame member having an opening therethrough defined by an inner peripheral flange portion, said frame member also including an outer peripheral border portion and an intermediate body portion uniting said flange and border portions, said flange portion presenting an innermost surface and a pair of oppositely facing generally similar side surfaces, said side surfaces each being joined at its outer end with an innermost surface of said body portion which innermost surface extends away from said flange so as to form a first pair of laterally projecting seats, said body portion also presenting a pair of side surfaces each being joined at its outer end with an innermost surface of said border portion which innermost surface extends away from said body portion so as to form a second pair of laterally projecting seats disposed in outwardly and laterally spaced relation with respect to the first pair of seats, and said frame member also having a pair of gas passages communicating with said opening through a pair of areas of said innermost flange surface which are disposed across from each other on generally opposite sides of said opening, and a pair of electrical lead receiving passageways extending inward from the outer periphery of said border portion and terminating in one of said pairs of laterally projecting seats, said pair of gas passages each extending from said opening outwardly through said flange and body portions and toward the outer periphery of the border portion of said frame member, a pair of electrode plaques each having a peripheral edge and an adjoining side surface engaging the complementary surfaces presented by each of said first pair of seats and being positioned thereby in spaced relation with said flange portion disposed therebetween, a pair of electrical leads operatively connected with said pair of electrode plaques and extending outwardly therefrom through said pair of lead receiving passageways to the exterior of said frame member, and an electrolyte vehicle having a peripheral edge and an adjoining side surface engaging the complementary surfaces presented by a seat of said second pair of seats and being positioned thereby with a side thereof abutting a side of the adjacent one of said pair of plaques, said vehicle having a thickness approximately equal to twice the lateral extent of each of said innermost surfaces on said border portion.

5. A fuel cell module comprising a series of identical structures assembled in side abutting fuel cell forming relationship, said structures each including a frame member having an opening therethrough defined by an inner peripheral flange portion, said frame member also including an outer peripheral border portion and an intermediate body portion uniting said flange and border portions, said flange portion presenting an innermost surface and a pair of oppositely facing generally similar side surfaces, said side surfaces each being joined at its outer end with an innermost surface of said body portion which innermost surface extends away from said flange so as to form a first pair of laterally projecting seats, said body portion also presenting a pair of side surfaces each being joined at its outer end with an innermost surface of said border portion which innermost surface extends away from said body portion so as to form a second pair of laterally projecting seats disposed in outwardly and laterally spaced relation with respect to the first pair of seats, and said frame member also having a pair of gas passages communicating with said opening through a pair of areas of said innermost flange surface which are disposed across from each other on generally opposite sides of said opening, and a pair of electrical lead receiving passageways extending inward from the outer periphery of said border portion and terminating in one of said pairs of laterally projecting seats, said pair of gas passages each extending from said opening outwardly through said flange, body and border portions of said frame member, a pair of electrode plaques each having a peripheral edge and an adjoining side surface engaging the complementary surfaces presented by each of said first pair of seats and being positioned thereby in spaced relation with said flange portion disposed therebetween, a pair of electrical leads operatively connected with said pair of electrode plaques and extending outwardly therefrom through said pair of lead receiving passageways to the exterior of said frame member, an electrolyte vehicle having a peripheral edge and an adjoining side surface engaging the complementary surfaces presented by a seat of said second pair of seats and being positioned thereby with a side thereof abutting a side of the adjacent one of said pair of plaques, said vehicle having a thickness approximately equal to twice the lateral extent of each of said innermost surfaces on said border portion, and means coacting in fuel cell forming relationship with portions of the outer sides presented by the end ones of said assembled structures.

References Cited in the file of this patent

UNITED STATES PATENTS

| | | |
|---|---|---|
| 409,365 | Langer | Aug. 20, 1889 |
| 507,139 | Kennedy | Oct. 24, 1893 |
| 2,969,315 | Bacon | Jan. 24, 1961 |

FOREIGN PATENTS

| | | |
|---|---|---|
| 350,100 | France | Aug. 4, 1905 |